United States Patent
Schulze

[11] Patent Number: 6,134,767
[45] Date of Patent: Oct. 24, 2000

[54] METHOD FOR EMBEDDING CONNECTION ELEMENTS IN A WALL

[75] Inventor: Bernd Schulze, Niederdorf, Germany

[73] Assignee: Meleghy Hydroforming GmbH & Co. KG, Zwickau, Germany

[21] Appl. No.: 09/057,824

[22] Filed: Apr. 9, 1998

[30] Foreign Application Priority Data

Apr. 10, 1997 [DE] Germany ............................ 197 14 902
Apr. 8, 1998 [JP] Japan ..................... 10-96208

[51] Int. Cl.$^7$ ...................................................... B23P 11/00
[52] U.S. Cl. ........................ 29/432.2; 29/432.1; 29/523; 72/327
[58] Field of Search ................ 29/432.2, 432.1, 29/523; 72/327

[56] References Cited

U.S. PATENT DOCUMENTS 4,027,370  6/1977  Bachar ....................................... 29/818

FOREIGN PATENT DOCUMENTS

| 0593950 | 4/1994 | European Pat. Off. . |
|---|---|---|
| 0686458 | 6/1995 | European Pat. Off. . |
| 19508632 | 9/1996 | Germany . |
| 19524164 | 9/1996 | Germany . |
| 05093950 | 4/1994 | Italy . |

OTHER PUBLICATIONS

Verbindungstechnik Mit Blindbefestigern, p. 93–94 published in "Blech Rohre Profil", 35(1998)2, Germany.

"Blindeinnietmuttern Und–Schrauben fur Optimale Montagelosungen" by M.H. Honsel published in "Der Konstrukteur" Jun. 1992, Germany.

*Primary Examiner*—P. W. Echols
*Assistant Examiner*—John C. Hong
*Attorney, Agent, or Firm*—Horst M. Kasper

[57] ABSTRACT

The invention relates to a method and a device for embedding connection elements in a wall. The connection elements (14, 34, 50) exhibit in each case a punch-like section. The punch-like section pierces the wall (22) based on the influence of a shearing force (Fs), wherein the shearing force (Fs) opposes the pressure force (Fd) of an internal high pressure acting on the wall (2). The punch-like section remains in the wall (2) after piercing the wall (2). A wide range of connection possibilities and a high connection loadability is thereby guaranteed at a low expenditure.

21 Claims, 7 Drawing Sheets

METHOD FOR EMBEDDING CONNECTION ELEMENTS IN A WALL

BACKGROUND OF THE INVENTION

1. Field of the Invention

The invention relates to a method and a device for embedding connection elements in a wall, preferably a piece of sheet metal.

2. Brief Description of the Background of the Invention Including Prior Art

It is necessary in autobody construction, container construction, pipeline construction, hydraulic control construction, and instrument panel construction to provide components, formed as hollow bodies and sheet-metal shaped parts, with connection elements. This is traditionally performed by welding nuts or screwing in autobody screws or car-body screws. This requires welding devices, screwing devices, and handling devices and a plurality of operating steps. It has therefore been proposed to combine the operating steps of the deformation of the components and the embedding of the connection elements.

In a process described in the German printed patent document DE 195 08 632 A1, a connection element is embedded simultaneously during the internal-high-pressure deformation of a sheet metal, in that the sheet metal not only applies itself to the engraving but also embraces the connection element based on the influence of the internal high pressure. This requires an expensive operating-cycle control in addition to good knowledge of the flow properties if one does not want to forgo the high positioning accuracy and the simultaneous embedding of several connection elements.

A further method is known from the European printed patent document EP 0 593 950 A1. This method teaches the forming of a hole surrounded by a collar, wherein a tubular-shaped insert is pressed into the collar and a liquid is introduced into the tubular-shaped structure in order to press the collar against the tubular-shaped insert. This method relates exclusively to the embedding of tubular-shaped reinforcing inserts into tubular-shaped structures, since the punch, required for forming the hole, has to be guided through the reinforcing insert. Other component structures and other connections elements are excluded. For this reason, connections have always to be led back and returned to these tubular-shaped inserts. In cases where this is possible, the additional connections decrease the loading capacity and the reliability of the connections. In other cases, one is still referred to expensive, traditional methods.

SUMMARY OF THE INVENTION

1. Purposes of the Invention

It is an object of the present invention to provide for a method and a device for embedding connection elements in a wall which allow a larger connection variety and connection loading capacity at a low expenditure.

These and other objects and advantages of the present invention will become evident from the description which follows.

2. Brief Description of the Invention

The present invention provides for a method for embedding connection elements in a wall. Connection elements are disposed in a rear part of a mold surface. The connection elements exhibit in each case a punch-like section having a jacket. A wall is placed against the mold surface and said wall has a face disposed remote relative to the mold surface. A high pressure is generated acting on the face disposed remote relative to the mold surface. The wall is pierced with the punch-like section subjected to a shearing force. The shearing force acts in a direction opposing a pressure force of the high pressure acting on the face disposed remote relative to the mold surface. The punch-like section is friction-fastened in the wall after the wall is pierced by the punch-like section.

The connection elements can be embedded into the wall at the same time or immediately following a deformation of the wall induced by the high pressure.

The connection elements can be friction-fastened by pushing and driving or propelling and thrusting in a controlled interaction with the high pressure acting on the face of the wall disposed remote to the connection elements.

A bead can be raised with the punch-like section upon piercing the wall. The bead is allowed to rest at the punch-like section based on an influence of the high pressure.

The punch-like section can be formed at least in part conically.

At least one coaxially disposed recess ring can be formed as an undercut of the punch-like section.

Sharp regions can be formed at the punch-like section.

The punch-like section can be formed in longitudinal direction with a tip of a heart shape or of an arrow shape.

The jacket of the punch-like section can be formed as a friction face.

The punch-like section can be adjoined to a shoulder collar, wherein the shoulder collar comes to rest at the wall for limiting a path of the punch-like section.

In each case at least one punch-like section can be formed at the connection elements.

A device for embedding connection elements in a wall includes means for applying high pressure to a first side of a wall. An internal-high-pressure deformation tool includes connection elements to be attached to the wall and each connection element has a punch-like section. There are provided means for feeding the connection elements to the wall. Means for applying a shearing force to the punch-like sections are provided, wherein the shearing force opposes the force of the high pressure.

At least one feed channel can form the means for feeding the connection elements to the wall. Each one of the feed channels can be subjected to pressure.

The means for applying a shearing force to the punch-like sections can be formed by a force-actuatable punch.

The means for applying a shearing force to the punch-like sections can be formed by a medium which can be subjected to pressure.

The connection elements exhibit the punches required for the piercing of the wall and can therefore be of any desired kind and shape. It is irrelevant for the embeddability of the connection elements whether the connection elements are formed as threaded bolts, brackets, clips, flanges, eyelets, loops, eye hooks, and the like, however, this is not irrelevant for the construction of the connections. The loading capacity of the connection elements can be influenced by the kind and form of the connection elements as well as by the form and the number of the punch-like sections. The opposing internal high pressure allows a low shearing force and/or thrust-energy and targeted penetration of the wall and the use of low-cohesive material for the connection elements. High positioning accuracies are achieved while saving handling expenditures and apparatus expenditures if the embedding of the connection elements is performed simultaneously with or immediately after the internal high pressure deformation while maintaining the position of the construction component. The connection elements are slowly pushed and driven or propelled and thrust in a controlled interaction with the internal high pressure. The raising of a bead and a peening provides material for holding. Necks, stopmarks, and knuckles, undercuts, friction rubbed surfaces, milled surfaces and structured surfaces effectively receive the material. The structuring and the surface constructions can be from rough to fissured, from flaky to grooved. Conical and sharp areas promote a penetration and improve the seat. Arrow-shaped or heart-shaped punch-like sections unite conicity, undercut and sharpness.

The invention device employs an internal-high-pressure deformation tool. The invention device exhibits additional means for feeding and for subjecting the connection elements to a shearing force and/or to a thrust force.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

According to the present invention, there is provided for a method for embedding connection elements 14, 34, 50 in a wall 2. The connection elements 14, 34, 50 exhibit in each case a punch-like section 22, 38, 52. The punch-like section 22, 38, 52 pierces the wall 2 under the influence of a shearing force Fs. The shearing force Fs opposes the pressure force Fd of an internal high pressure acting on the wall 2. The punch-like section 22, 38, 52 is held by the wall 2 after the punch-like section 22, 38, 52 pierces the wall 2.

The connection elements 14, 34, 50 can be embedded into the wall at the same time or immediately following to the internal high pressure deformation of the wall 2. The connection elements 14, 34, 50 can be formed by pushing and driving or propelling and thrusting in controlled interaction with the internal high pressure.

The punch-like section 22, 38, 52 can raise a bead 32, 48 upon piercing the wall 2. The bead 32, 48 can come to rest at the punch-like section 22, 38, 52 based on the influence of the internal high pressure. The punch-like section 22, 38, 52 can be formed conically at least in part.

The punch-like section 22 or, respectively, 38, 52 can exhibit at least one coaxially disposed recess ring 26 and/or undercut 44, 56. The punch-like section 22 can exhibit sharp regions 24, 28.

The punch-like section 52 or, respectively, 38 can be formed like a heart or like an arrow in longitudinal section. The jacket of the punch-like section 22, 38, 52 can be formed and/or structured as a friction face.

The punch-like section 22 can adjoin to a shoulder collar 30. The shoulder collar 30 can come to rest at the wall 2 for limiting a path of the punch-like section 22. The connection elements can exhibit in each case one or a plurality of punch-like sections.

A device for embedding connection elements in a wall employs an internal-high-pressure deformation tool 10. The internal-high-pressure deformation tool 10 comprises in addition a first means for feeding the connection elements 14, 34, 50 to the wall 2. A second means for indirect or direct application of a shearing force Fs to the punch-like sections 22, 38, 52 is disposed at the connection elements 14, 34, 50. The shearing force Fs opposes the pressure force Fd of the simultaneously acting internal high pressure.

The first means can be formed by one or several feed channels 16. The feed channels 16 can be subjected to pressure. The second means can be formed by a force-actuatable punch 18, 46 or a medium which can be subjected to pressure.

Internal high-pressure deformation tools include means for receiving a workpiece and for forming an engraving and a compressed area, wherein the workpiece can be pressed from the compressed area against an engraving face under the influence of a pressure medium. Hollow profile elements are placed and received between two tool halves. The two tool halves form an engraving, and the two tool halves guide between themselves in axial direction two pressure rams. The hollow profile element is subjected to a pressure medium through the two tool halves. Flat structures are clamped between the two tool halves. One tool half forms an engraving and the other tool half forms a pressure chamber.

Figure 1:
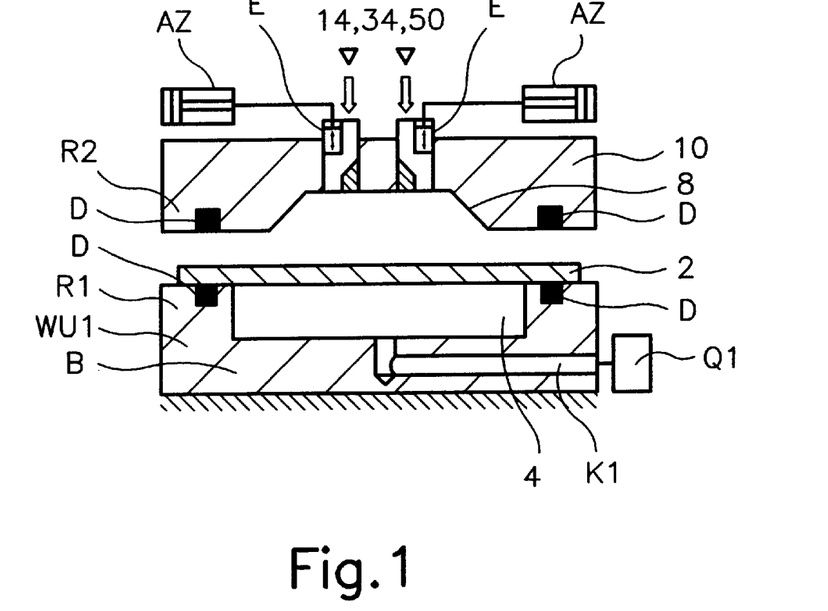
FIG. 1 is a sectional view of an invention device formed as a tool for the hydrodeformation of pieces of sheet metal, in an open position.
Figure 2:
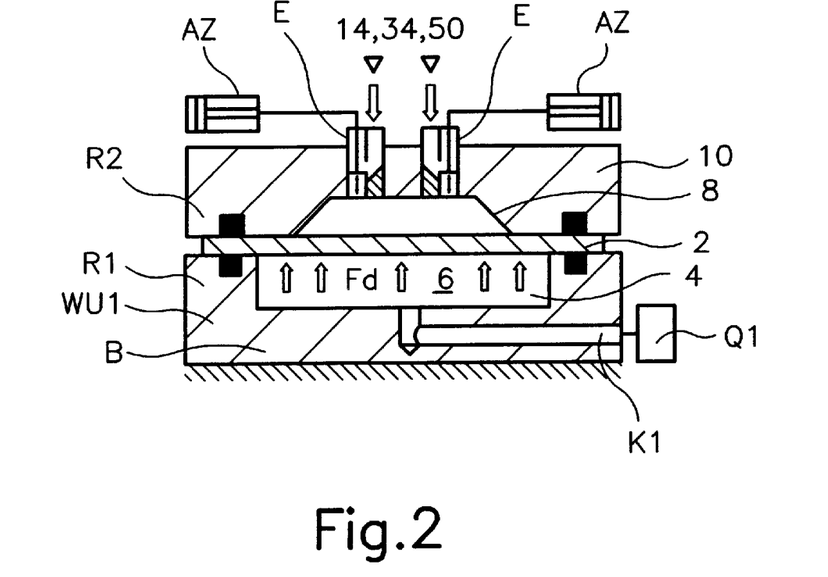
FIG. 2 is a sectional view of the device of FIG. 1, in a closed position.
Figure 3:
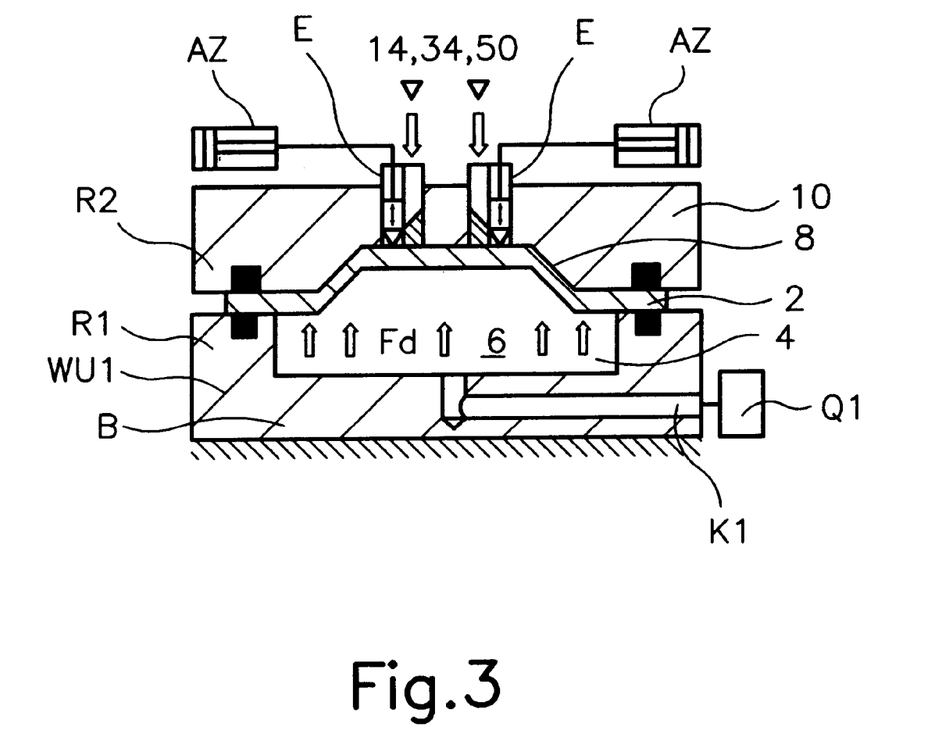
FIG. 3 is a sectional view of the device of FIG. 1 before a connection element is embedded into the piece of sheet metal.

An invention device, formed as a tool for the hydrodeformation of pieces of sheet metal, is shown in FIGS. 1–3. The tool consists of a spatially fixed lower tool half WU1 and a vertically movable upper tool half 10. The lower tool half WU1 has a floor B and an upwardly extending circumferential edge R1. Circumferential seals D are embedded in the upper face of the lower tool half WU1 and in the lower face of the upper tool half 10. A pressure-medium channel K1, supplied by a pressure source Q1, leads through the floor B, wherein the pressure-medium channel K1 applies pressure to pressure chamber 4 of the lower tool half WU1. For example water, oil, air, and water-oil emulsions can be employed as pressure medium. The piece of sheet metal 2 to be deformed rests on the seals D. The upper tool half 10 exhibits a pressure mold, designated as engraving 8, and a downwardly extending edge R2. Circumferential seals D are inserted and embedded in the lower face of the upper tool half 10. The upper tool half 8 also receives two inserts E. The inserts E can be loaded from the top with connection elements 14, 34, 50 and lead orthogonally to the engraving 8. Punches 18 (FIG. 6 and 7) are guided in the inserts E. On the one hand, the punches 18 align with the engraving 8 (FIG. 2) during the deformation and thus receive and absorb the pressure, present in the pressure chamber 4 and, on the other hand, the punches 8 press the connection elements 14, 34, 50, guided from above below the punches 18, against the piece of sheet metal 2, resting at the engraving 8 after the deformation (FIG. 3).

In order to be able to deform the piece of sheet metal 2, the upper tool half 10 is first moved downwardly and braced against the spatially fixed lower tool half WU1. The piece of sheet metal 2, clamped between the two tool halves, closes thereby the pressure chamber 4 of the lower tool half WU1 in an upward direction (FIG. 2). Simultaneously, the punches 18 (FIG. 6) move out of their upper rest position into the lower support and bracing position. Subsequently, the pressure chamber 4 is subjected to pressure through the pressure source Q1 and the pressure-medium channel K1 such that the piece of sheet metal 2 rests at the engraving 8 or, respectively, the punches 18 aligned with the engraving 8, based on the influence of the pressure present in the pressure chamber 4.

Figure 6:
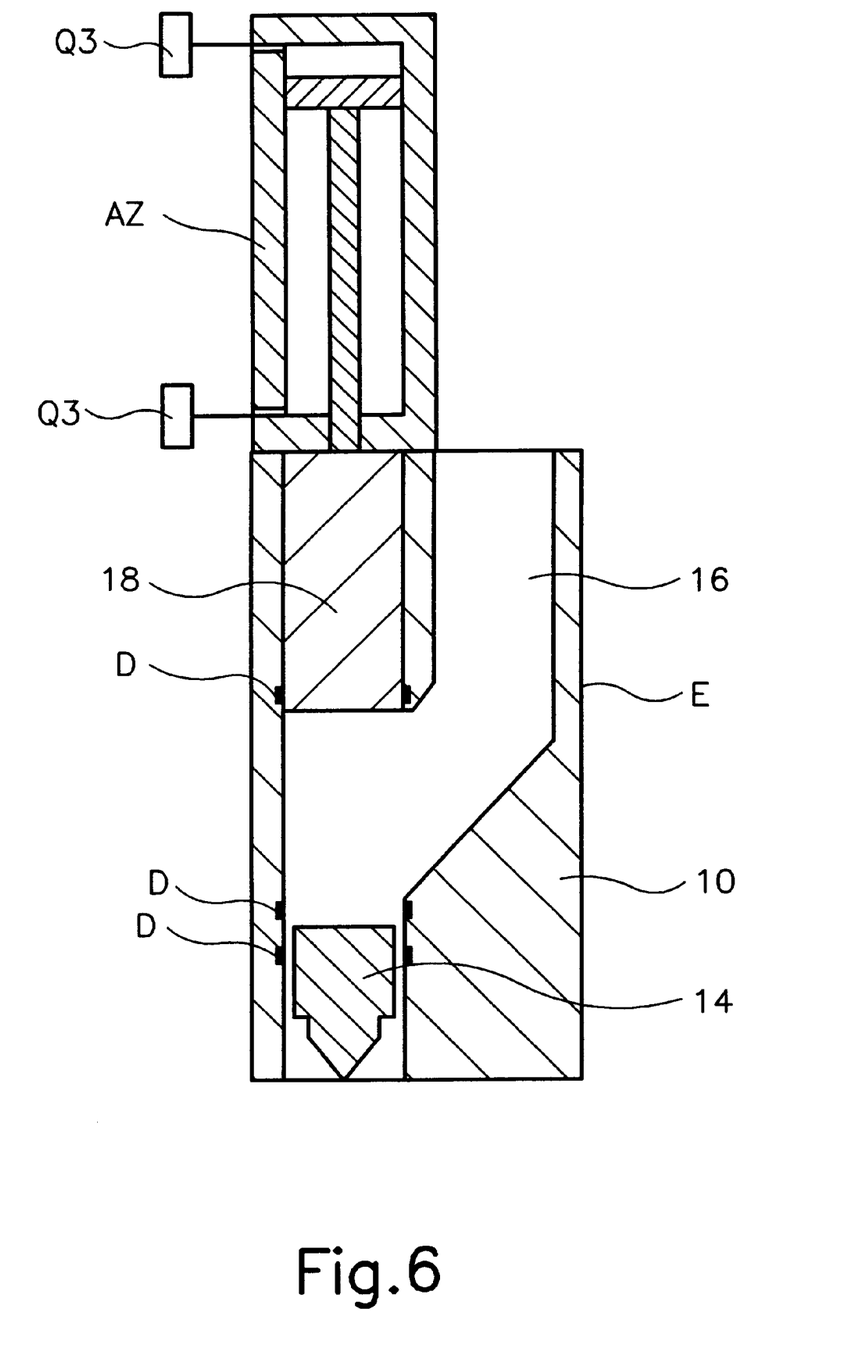
FIG. 6 is a sectional view of a tool insert for feeding and for embedding the connection elements.

Following deformation, the punches 18 return into their rest position, whereby the punches 18 free the path for the connection elements 14, 34, 50, fed from above. Once the connection elements 14, 34, 50 have slipped below the punches 18, the connection elements 14, 34, 50 are pressed with the punches 18 against the piece of sheet metal 2. Punch forces of 1500 N are required in case of a theoretical yield strength of the piece of sheet metal 2 of 500 N/mm$^2$ and a theoretical penetration area of 3 mm$^2$. In any case, the punch forces have to be higher than the yield strength of the material to be penetrated and punched through. A pressure of below 800 bar is maintained in the pressure chamber 4 when the connection elections are pressed through the piece of sheet metal. Once the connection elements 14, 34, 50 have pierced and penetrated through the piece of sheet metal 2, the pressure is increased to above 800 bar for the deformation of the piece of sheet metal 2 with the connection elements 14, 34, 50. The strength of the connection elements 14, 34, 50 must be higher than the strength of the piece of sheet metal 2 such that the deformation does not occur before the piercing and penetration. The punches 18 should in turn have a higher strength than the connection elements 13, 34, 50 in the interest of a low wear of the punches 18. Materials for the pieces of sheet metal can be non-coated and coated ferrous metals and nonferrous metals, for example steel, aluminum, and magnesium, however, other materials can also be employed. The wall thicknesses of the pieces of sheet metal 2 are between 0.5 mm and 3 mm. The stability of the piece of sheet metal below a thickness of about 0.5 mm becomes too low for receiving the connection elements 14, 34, 50. The connection elements 14, 34, 50 can be screwed in a conventional way into a piece of sheet metal having a thickness above 3 mm. No tolerance problems occur based on the calibration occurring under a higher pressure. The structure of the connection elements 14, 34, 50 is characterized by a tip for the piercing through the piece of sheet metal and by barb-like sections, wherein the pierced material can rest against the barb-like sections. An orthogonal embedding direction of the connection elements 14, 34, 50 allows the separation of the upper tool half 10 and the piece of sheet metal 2. The punches 18 can be fed and advanced, as indicated, by pressure-medium-actuated ram cylinders AZ, or else by purely mechanical drives.

Figure 4:
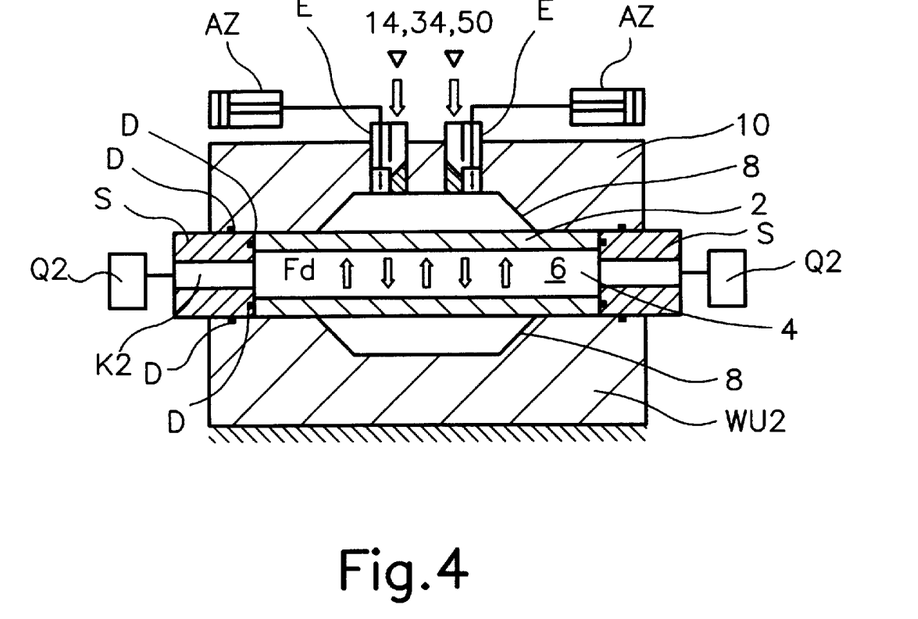
FIG. 4 is a sectional view of an invention device formed as a tool for an internal-high-pressure deformation of hollow-bodies.
Figure 5:
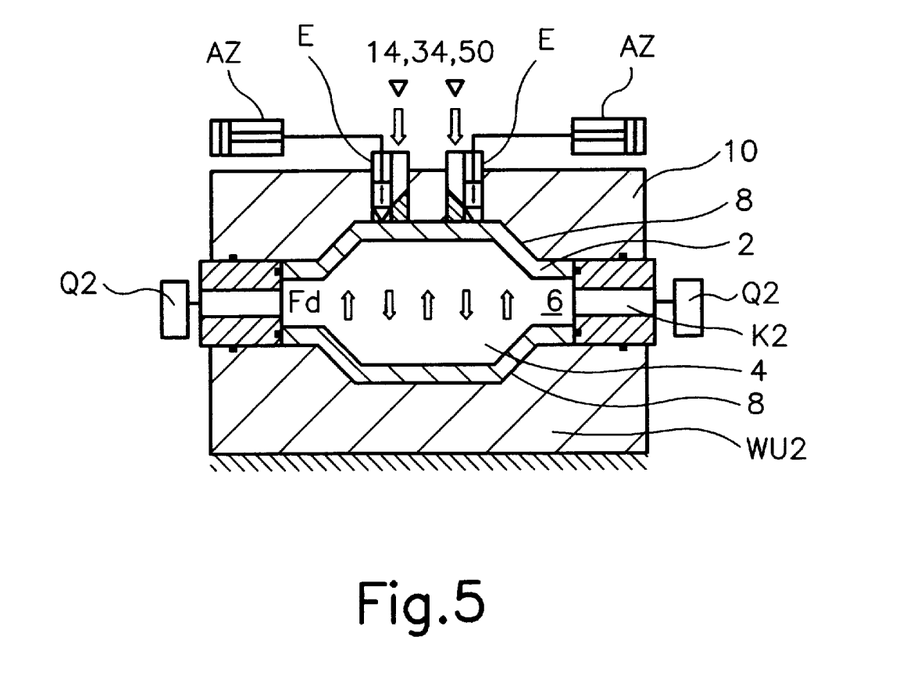
FIG. 5 is a sectional view of the device of FIG. 4 before a connection element is embedded into a wall of the hollow body.

An invention device, formed as a tool for the internal-high-pressure deformation, is shown in FIGS. 4 and 5. The tool is comprises of a spatially fixed lower tool half WU2 and a vertically movable upper tool half 10. Both tool halves WU2 and 10 exhibit a compression mold, designated as engraving 8. The pressure chamber 4 is formed by the hollow body with the wall 2, disposed between the two tool halves. The sealing of the pressure chamber 4 is performed by so-called rams S. The rams S are surrounded circumferentially and on the face by circumferential sealing rings D and rest at the faces of the hollow body and support the guiding of the material. Channels K2 are led through the rams S, wherein the channels K2 are connected to the pressure sources Q2. Inserts E (FIGS. 4, 5) are to be disposed in one tool half or in both tool halves. Regardless whether the deformation is performed in this device by a pressure build-up in the interior of the hollow body, the process for the embedding of the connection elements occurs in the same way as in case of the device for hydrodeformation and, therefore, reference is made to the aforecited statements.

Figure 7:
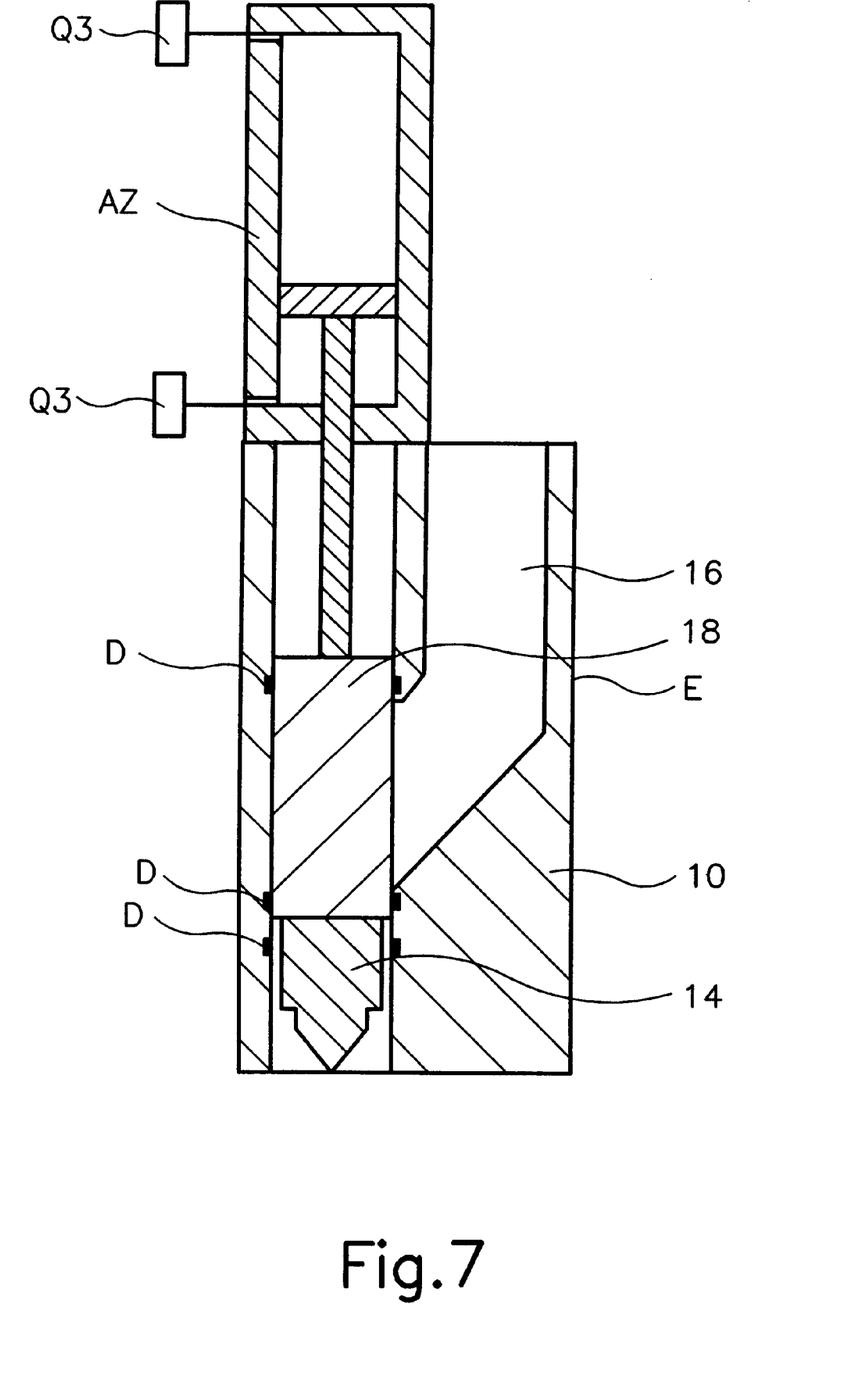
FIG. 7 is a sectional view of the tool insert before embedding the connection elements.

FIGS. 6 and 7 illustrate the method of operation of the inserts E. According to FIG. 6 the punch 18 is kept in its upper rest position based on the ram cylinder AZ connected to the pressure sources Q3 such that a connection element 14 can slip from above through the feed channel 16 under the punch 18. If the previously described prerequisites are given for pressing the connection element 14 into a wall under pressure, the ram cylinder AZ guides the punch 18 toward the connection element 14. The ram cylinder AZ thereby seals the chamber in which the connection element 14 is disposed both against the feed channel 16 and against its own open space such that a leak during the piercing of the wall does not have a negative effect on the method of operation. The feed channel 16 can also be sealed by vertically and horizontally actuated slides instead of the aforecited method or in addition to the aforecited method.

Figure 8:
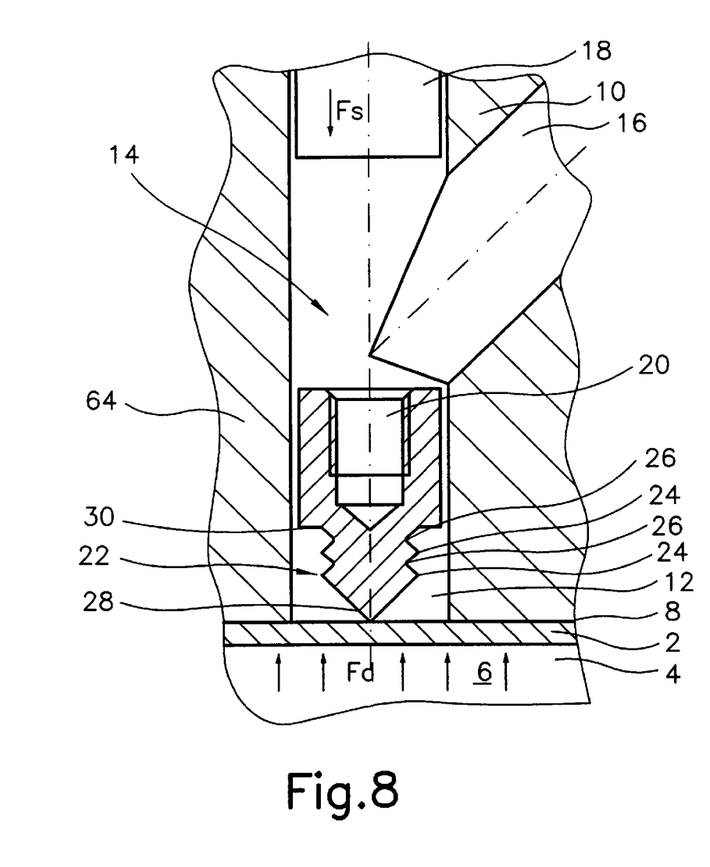
FIG. 8 is a sectional view of a schematic representation of a first embodiment of the invention device with a loaded connection element.

FIGS. 8 to 12 shows the method of the embedding of the connection element into the wall. Within this meaning, FIG. 8 shows a piece of sheet metal 2. The sheet metal 2 is pressed with a pressure medium 6, present in the pressure chamber 4, with a pressure force Fd against the engraving 8 of the tool half 10. The pressure medium, for example water or gas, is supplied by a pressure source, not shown. A connection element 14 is disposed on the sheet metal 2 in a channel 12, wherein the channel 12 is disposed perpendicular to the sheet metal 2. The connection element 14 has been supplied and fed through the inclined feed channel 16 by means of air pressure. The pressure source, supplying the feed channel with air, is also not shown. A punch 18 is guided in the channel 12 above the connection element 14, wherein the punch 18 develops a shearing force Fs, in a way not shown. The connection element 14 is formed symmetrically around a drive axis and exhibits at its upper face a vertical threaded borehole 20, disposed in a sliding section 64, for a screw connection and at its lower face a punch-like section 22 with circumferential, sharp-edged projections 24 and grooves 26 and a downwardly pointing tip 28. The shoulder collar 30 of the connection element 14 forms the separation plane to the slender, punch-like section 22.

Figure 9:
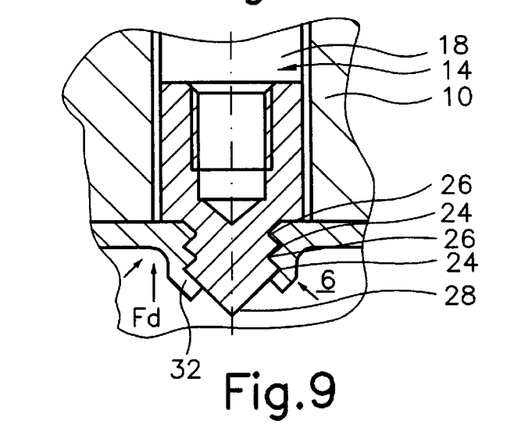
FIG. 9 is a sectional view of the device according to FIG. 8 with an embedded connection element.

The method of operation is as follows:

In order to insert and embed the connection element 14 into the sheet metal 2, which sheet metal 2 corresponds in this case for example to a section of a tubular hollow body placed under internal high pressure, the punch 18 is driven downwardly with the shearing force Fs. The tip 28 of the connection element 14, subjected to the shearing force Fs, pierces the sheet metal 2 and raises a bead 32 (FIG. 9). However, based on the counterpressure of the pressure medium 6, the bead 32 does not detach itself from the punch-like section 22, but rather rests against the punch-like section 22. Initially, the bead 32 rests at the envelope of the cone of the tip 28. Upon a further pressing forward and advance of the punch-like section 22, an inner-disposed first region of the bead 32 is roughened by the first projection 24, is subsequently pressed into the first groove 26 with the pressure medium 6, then renewedly roughened by the pursuing second projection 24, and finally pressed with the pressure medium 6 into the second groove 26, while an outer-disposed second region of the bead 32 is roughened by the first projection 24 and subsequently pressed into the first groove 26 of the punch-like section 22 near the shoulder collar 30. Based on this intense interaction between the punch-like section 22 and the sheet metal 2, having been deformed and raised as bead 32, there results an intimate connection between the two, wherein this connection can be subjected to high loads after the return of the punch 18 and after the pressure chamber 4 is pressureless. Such an intimate connection can of course also be achieved with other constructions of the punch-like section.

Figure 10:
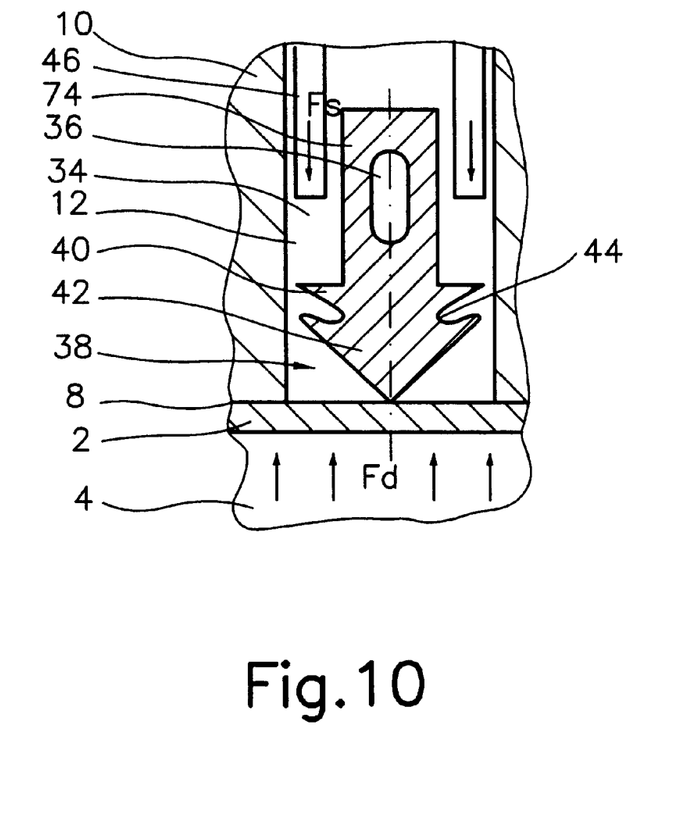
FIG. 10 is a sectional view of a second embodiment of the device with a loaded connection element.
Figure 11:
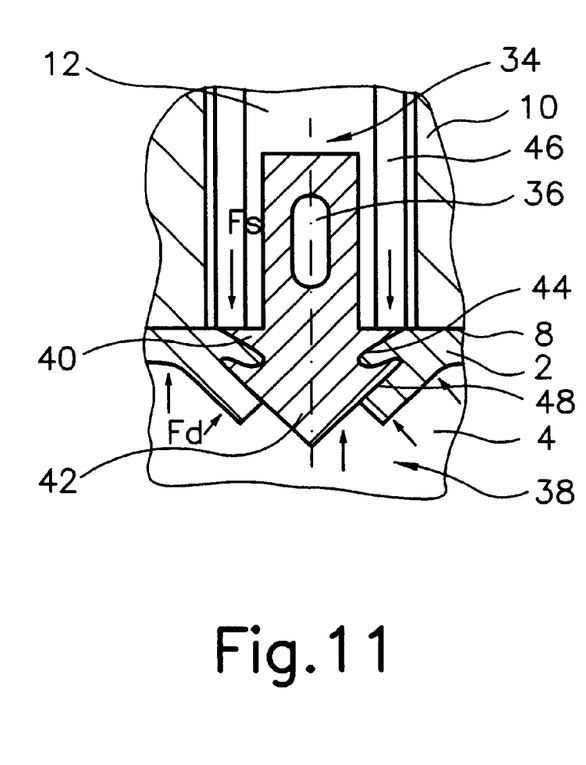
FIG. 11 is a sectional view of the embodiment according to FIG. 10 with an embedded connection element.
Figure 12:
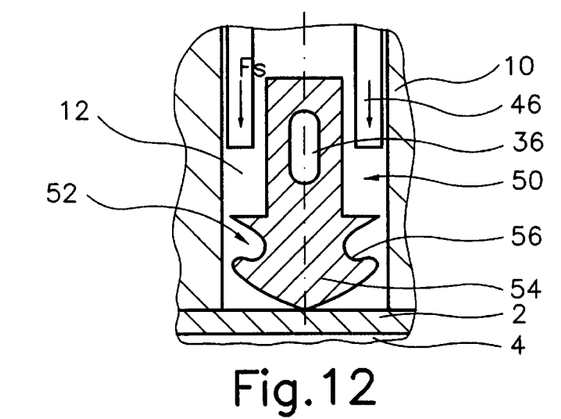
FIG. 12 is a sectional view of a third embodiment of the invention device.

A further embodiment shown in FIGS. 10 and 11 exhibits an otherwise also axisymmetrically constructed connection element 34, which exhibits however an elongated hole 36, extending in a slender shaft 74 in the connection element 34, instead of a threaded bore. A wider and broader punch-like section 38 adjoins to the slender shaft 74 in downward direction. The punch-like section 38 is subdivided into a downwardly tapering flat region 40 and an adjoining arrow-shaped region 42. The downwardly tapering flat region 40 and the arrow-shaped region 42 are separated from each other by the undercut 44. An annular punch 46, developing the shearing force Fs, is guided above the connection element 34, disposed on the sheet metal 2.

The method of operation is as follows:

In order to embed the connection element 34 into the sheet metal 2, which sheet metal 2 corresponds in this case for example to a section of a sheet-metal formed part placed under internal high pressure, the punch 46 is initially again driven downwardly with the shearing force Fs such that the arrow tip pierces the sheet metal 2 and raises a bead 48. The bead 48 rests first at the jacket of the arrow-shaped region 42. As soon as the advancing punch-like section 38 however releases the undercut 44, the raised bead 48 starts also to expand into the undercut 44 until finally, alternatingly, material layers of the punch-like section 38 and of the bead 48 are forced together under pressure. A similar, intimate connection results also upon use of a connection element 50, shown in FIG. 12. The punch-like section 52 of the connection element 50 exhibits in a longitudinal section, a heart-shaped region 54 instead of the punch-like section 52, wherein the heart-shaped region 54 adjoins to the undercut 56.

Additional loading-capacity increases are possible if one and the same connection element is provided with a plurality of punch-like sections. This is being offered when the connection element is for example a bracket, a clip or a flange. The punch-like section can also exhibit friction faces in addition to the most varied finer or rougher structurings and surface configurations. The formation of the bead, if such a bead is desired, can be influenced process-technologically by the build-up of the shearing force and pressure force and structurally by the punch-like sections 22, 38, wherein the punch-like sections can also have special distributed sharp tip regions and peripheral regions. Preferably, the connection elements are inserted and embedded during the internal-high-pressure deformation of the component or immediately following said deformation, since this is not only economical but also allows high positioning accuracies while maintaining the position fixation. The connection elements can however also be inserted and embedded independent of accompanying, preceding, or subsequent internal high pressure deformation processes. A component already provided with a connection element can be transferred to and accepted in other internal high pressure deformation tools is possible since the punch-like sections remain in the wall and do not leave any openings.

It will be understood that each of the elements described above, or two or more together, may also find a useful application in other types of connection elements differing from the types described above.

While the invention has been illustrated and described as embodied in the context of a method and device for embedding connection elements in a wall, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for embedding connection elements in a wall comprising the steps of furnishing a mold surface;

disposing connection elements in a rear part of the mold surface, wherein the connection elements exhibit in each case a punch-like section having a jacket;

placing a wall against the mold surface and said wall having a face disposed remote relative to the mold surface and a face disposed neighboring to the mold surface;

generating a high pressure acting on the face disposed remote relative to the mold surface for pressing the wall and the face disposed neighboring to the mold surface against the mold surface;

piercing the wall pressed against the mold surface with a moving punch-like section subjected to a shearing force, wherein the shearing force acts in a direction opposing a pressure force of the high pressure acting on the face of the wall disposed remote relative to the mold surface;

friction-fastening the punch-like section in the wall after the wall is pierced by the punch-like section.

2. The method according to claim 1, further comprising embedding the connection elements into the wall at the same time or immediately following a deformation of the wall induced by the high pressure.

3. The method according to claim 1, further comprising friction-fastening the connection elements by pushing and driving or propelling and thrusting in a controlled interaction with the high pressure acting on the face of the wall disposed remote to the connection elements.

4. The method according to claim 1, further comprising raising a bead with the punch-like section upon piercing the wall;

allowing the bead to rest at the punch-like section based on an influence of the high pressure.

5. The method according to claim 1, further comprising forming the punch-like section at least in part conically.

6. The method according to claim 1, further comprising forming at least one coaxially disposed recess ring as an undercut of the punch-like section.

7. The method according to claim 1, further comprising forming sharp regions at the punch-like section.

8. The method according to claim 1, further comprising foaming the punch-like section in longitudinal direction with a tip of a heart shape or of an arrow shape.

9. The method according to claim 1, further comprising forming the jacket of the punch-like section as a friction face.

10. The method according to claim 1, further comprising adjoining the punch-like section to a shoulder collar, wherein the shoulder collar comes to rest at the wall for limiting a path of the punch-like section.

11. The method according to claim 1, further comprising forming in each case at least two punch-like section at the connection elements.

12. A method for embedding connection elements (14, 34, 50) in a wall (2), wherein the connection elements (14, 34, 50) exhibit in each case a punch-like section (22, 38, 52), wherein the punch-like section (22, 38, 52) pierces the wall (2) under the influence of a shearing force (Fs), wherein the shearing force (Fs) opposes the pressure force (Fd) of an internal high pressure acting on the wall (2), and wherein the punch-like section (22, 38, 52) is held by the wall (2) after the punch-like section (22, 38, 52) pierces the wall (2).

13. The method according to claim 12, wherein the connection elements (14, 34, 50) are embedded into the wall at the same time or immediately following to the internal high pressure deformation of the wall (2) and wherein the connection elements (14, 34, 50) are formed by pushing and driving or propelling and thrusting in controlled interaction with the internal high pressure.

14. The method according to claim 12, wherein the punch-like section (22, 38, 52) raises a bead (32, 48) upon piercing the wall (2), wherein the bead (32, 48) comes to rest at the punch-like section (22, 38, 52) based on the influence of the internal high pressure and wherein the punch-like section (22, 38, 52) is formed conically at least in part.

15. The method according to claim 12, wherein the punch-like section (22 or, respectively, 38, 52) exhibits at least one coaxially disposed recess ring (26) and/or undercut (44, 56) and wherein the punch-like section (22) exhibits sharp regions (24, 28).

16. The method according to claim 12, wherein the punch-like section (52 or, respectively, 38) is formed like a heart or like an arrow in longitudinal section, and wherein the jacket of the punch-like section (22, 38, 52) is formed and/or structured as a friction face.

17. The method according to claim 12, wherein the punch-like section (22) adjoins to a shoulder collar (30), and wherein the shoulder collar (30) comes to rest at the wall (2) for limiting a path of the punch-like section (22), and wherein the connection elements exhibit in each case one or a plurality of punch-like sections.

18. A method for embedding connection elements in a wall comprising the steps of furnishing a mold surface;

furnishing a recess in the mold surface;

placing a connection element with a punch-like section in the recess of the mold surface, wherein the connection elements exhibit in each case a punch-like section having a jacket;

placing a wall in front of the mold surface and said wall having a face disposed remote relative to the mold surface and a face disposed neighboring to the mold surface;

generating a high pressure acting on the face disposed remote relative to the mold surface for pressing the wall and the face disposed neighboring to the mold surface against the mold surface;

pushing the connection element out of the recess against the face disposed remote relative to the mold surface for moving and punching the connection element with the punch-like section advancing into the wall pressed against the mold surface;

piercing the wall with the moving punch-like section in a direction opposite to the pressure direction of the high pressure acting on the face of the wall disposed remote relative to the mold surface;

friction-fastening the punch-like section in the wall after the wall is pierced by the punch-like section.

19. The method according to claim 18, further comprising forming the punch-like section at least in part conically;

forming at least one coaxially disposed recess ring as an undercut of the punch-like section;

forming sharp regions at the punch-like section;

adjoining the punch-like section to a shoulder collar, wherein the shoulder collar comes to rest at the wall for limiting a path of the punch-like section;

embedding the connection elements into the wall at the same time or immediately following a deformation of the wall induced by the high pressure, wherein the connection element in a rest position substantially does not protrude out of the recess beyond the level of the mold surface;

friction-fastening the connection elements by pushing and driving or propelling and thrusting in a controlled interaction with the high pressure acting on the face of the wall disposed remote to the connection elements;

raising a bead with the punch-like section upon piercing the wall;

allowing the bead to rest at the punch-like section based on an influence of the high pressure.

20. The method according to claim 18, further comprising placing a lower tool half facing the face disposed remote relative to the mold surface;

filling the lower tool half with high pressure for generating a high pressure acting on the face disposed remote relative to the mold surface.

21. The method according to claim 18, further comprising employing a wall having a thickness of from about 0.5 millimeter to 3 millimeters and having a yield strength of at least about 500 N/mm$^2$;

maintaining a pressure below 800 bar facing the face disposed remote relative to the mold surface;

employing punch forces of at least about 1500 N.

* * * * *